United States Patent [19]
Morrison

[11] Patent Number: 5,752,007
[45] Date of Patent: May 12, 1998

[54] SYSTEM AND METHOD USING SEPARATORS FOR DEVELOPING TRAINING RECORDS FOR USE IN CREATING AN EMPIRICAL MODEL OF A PROCESS

[75] Inventor: Steven Michael Morrison, Austin, Tex.

[73] Assignee: Fisher-Rosemount Systems, Inc., Austin, Tex.

[21] Appl. No.: 613,913

[22] Filed: Mar. 11, 1996

[51] Int. Cl.$^6$ ................................................. G06T 1/40
[52] U.S. Cl. ........................... 395/500; 364/424.088; 395/21
[58] Field of Search ..................... 395/500, 2.11, 395/2.41, 2.68, 21; 364/578, 424.088, 972.4

[56] References Cited

U.S. PATENT DOCUMENTS

| | | | |
|---|---|---|---|
| 3,891,836 | 6/1975 | Lee | 235/151.12 |
| 5,200,816 | 4/1993 | Rose | 358/80 |
| 5,222,196 | 6/1993 | Bigus | 395/26 |
| 5,265,192 | 11/1993 | McCormack | 395/22 |
| 5,325,298 | 6/1994 | Gallant | 395/759 |
| 5,420,810 | 5/1995 | Yamakawa et al. | 364/724.19 |
| 5,526,407 | 6/1996 | Russell et al. | 379/89 |

OTHER PUBLICATIONS

Care and Feeding of Neural Nets, Bill Machrone (1995).
Engineering Neural Networks with Genetic Algorithms (1995).
Dong et al., "Batch Tracking Via Nonlinear Principal Component Analysis," pp. 1–34, presented at NN Club Meeting (Sep. 28, 1995).
Dong et al., "Batch to Batch Optimization Using Neural Network Models," pp. 1–32, presented at NN Club Meeting (Sep. 28, 1995).
Geladi, "Notes on the History and Nature of Partial Least Squares (PLS) Modelling," 2 J. Chemometrics, pp. 231–246 (1998).
Geladi et al., "Partial Least–Squares Regression: A Tutorial," 185 Analytical Chimica Acta 1 (1986).
Hayes et al. "Experience Using a Neural Network to Model Polymer Molecular Weight," pp. 1–5, presented at ISA Trade Show (Oct. 4, 1995).
Helland, "On the Structure of Partial Squares Regression," 17(2) Commun. Statist.–Simula., pp. 581–607 (1988).
Kaspar et al., "Dynamic PLS Modelling for Process Control," 48 Chemical Engineering Science, pp. 3447–3461 (1993).
Kresta et al., "Multivariate Statistical Monitoring of Process Operating Performance," 69 Canadian J. Chem. Engineering, pp. 35–47 (Feb. 1991).
Kresta et al., "Development of Inferential Process Models Using PLS," 18 Computers Chem. Engng., pp. 597–611 (1994).
Kosanovich et al., "Multi–Way PCA Applied to an Industrial Batch Process," Proceedings of Am. Control Conference, pp. 1294–1298 (1994).

(List continued on next page.)

Primary Examiner—Kevin J. Teska
Assistant Examiner—Dan Fiul
Attorney, Agent, or Firm—Marshall, O'Toole, Gerstein, Murray & Borun

[57] ABSTRACT

A device and method develop a training record for use in creating an empirical model of a process from data associated with the process. Data from a continuous process in the form of a continuous file or data from a set of batch files associated with different runs of a batch process is used to develop a file having multiple values for each of a plurality of variables associated with the process. A flag or other indicator is placed within the file to indicate the location of a significant event within the process or the location at which the data from different batch files was concatenated together. A record is then developed from the file by selecting a multiplicity of values within the file. Thereafter, it is determined if any two of the selected values within the record are located within the file at positions which are on different sides of the position indicated by the flag or other indicator. If so, that record is prevented from being used as a training record for training an empirical model of the process.

26 Claims, 8 Drawing Sheets

OTHER PUBLICATIONS

MacGregor et al., "Monitoring Batch Process," *NATO Advanced Study Institute (ASI) for Batch Processing Systems Eng.*, pp. 1–20 (May 1992).

MacGregor et al., "Multivariate Statistical Process Control of Batch Processes Using PCA and PLS," pp. 525–529 (1995).

MacGregor et al., "Process Monitoring and Diagnosis by Multiblock PLS Methods," 40 *AIChE J.*, pp. 826–838 (May 1994).

MacGregor, "Statistical Process Control of Multivariate Processes," presented at *Advanced Control of Chemical Processes*, IFAC ADCHEM, 11 pages (May 1994).

MacGregor et al., "Statistical Process Control of Multivariate Processes," 3 *Control Eng. Practice*, pp. 403–414 (1995).

Manne, "Analysis of Two Partial–Least Squares Algorithms for Multivariate Calibration," 2 *Chemometrics and Intelligent Laboratory Systems*, pp. 187–197 (1987).

Morrison et al., "Neural Networks for Process Prediction," 8 pp., presented at ISA Trade Show (Oct. 3, 1995).

Nomikos et al., "Multivariate SPC Charts for Monitoring Batch Processes," 37 *Technometrics*, pp. 41–59 (Feb. 1995).

Qin et al., "A Data–Based Process Modeling Approach and Its Applications," *Preprints of the Third IFAC Dycord+ Symposium*, pp. 321–326 (1992).

Qin et al., "Combining Statictis and Experts Systems With Neural Networks For Empirical Process Modeling," presented at *ISA International Conf.*, pp. 1711–1720 (Sep. 1993).

Qin, "Integration and Comparison of Neural Networks and Conventional Modeling Techniques," *Dissertation for Ph.D. at the University of Maryland*, (1992).

Qin et al., "Nonlinear PLS Modeling Using Neural Networks," 16 *Computers Chem. Engng.*, pp. 379–391 (1992).

Wise, "Tutorial: Using the PLS Toolbox in PAC Applications" 5 *Process Control and Quality*, pp. 73–85 (1993).

Wold et al., "Multi–Way Principal Components and PLS–Analysis," 1 *J. Chemometrics*, pp. 41–56 (1987).

Wold et al., "Principal Component Analysis," 2 *Chemometrics and Intelligent Laboratory Systems*, pp. 37–52 (187).

Qin, "Partial Least Squares Regression for Recursive System Identification," IEEE Decision and Control, *32nd Annual Conf.*, pp. 2617–2622 (Dec., 1993).

Qin, "A Statistical Perspective of Neural Networks for Process Modeling and Control," IEEE Intelligent Control, *1993 Int'l. Symposium*, pp. 599–604. (Dec., 1993).

Fisz, "Probability Theory and Mathematical Statistics," *John Wiley and Sons*, pp. 79–91 (Dec., 1963).

| Temperature | Pressure | Flow | Output |
|---|---|---|---|
| 0.004360 | 0.547823 | 0.730931 | 0.223456 |
| 0.003821 | 0.237327 | 0.434989 | 0.223456 |
| 0.345678 | 0.111694 | 0.155292 | 0.223456 |
| 0.332413 | 0.835944 | 0.017275 | 0.223456 |
| 0.865945 | 0.657226 | 0.823221 | 0.223456 |
| 0.060618 | 0.543997 | 0.806486 | 0.321095 |
| 0.707493 | 0.503949 | 0.489926 | 0.321095 |
| 0.774467 | 0.248617 | 0.874449 | 0.321095 |
| 0.784609 | 0.347294 | 0.459920 | 0.321095 |
| 0.895638 | 0.459231 | 0.356870 | 0.321095 |

FIG. 8A

| Temperature | Pressure | Flow | Output |
|---|---|---|---|
| 0.004360 | 0.547823 | 0.730931 | 0.223456 |
| 0.003821 | 0.237327 | 0.434989 | 0.223456 |
| 0.345678 | 0.111694 | 0.155292 | 0.223456 |
| 0.332413 | 0.835944 | 0.017275 | 0.223456 |
| 0.865945 | 0.657226 | 0.823221 | 0.223456 |
| SEPARATOR | SEPARATOR | SEPARATOR | SEPARATOR |
| 0.060618 | 0.543997 | 0.806486 | 0.321095 |
| 0.707493 | 0.503949 | 0.489926 | 0.321095 |
| 0.774467 | 0.248617 | 0.874449 | 0.321095 |
| 0.784609 | 0.347294 | 0.459920 | 0.321095 |
| 0.895638 | 0.459231 | 0.356870 | 0.321095 |

FIG. 8B

TRAINING RECORDS

| No. | Input 1 | Input 2 | Input 3 | Output |
|---|---|---|---|---|
| 1. | 0.895638 | 0.347294 | 0.874449 | 0.321095 |
| 2. | 0.784609 | 0.248617 | 0.489926 | 0.321095 |
| 3. | 0.774467 | 0.503949 | 0.806486 | 0.321095 |
| 4. | 0.707493 | 0.543997 | 0.823221 | 0.321095 |
| 5. | 0.060618 | 0.657226 | 0.017275 | 0.321095 |
| 6. | 0.865945 | 0.835944 | 0.155292 | 0.223456 |

FIG. 9

SYSTEM AND METHOD USING SEPARATORS FOR DEVELOPING TRAINING RECORDS FOR USE IN CREATING AN EMPIRICAL MODEL OF A PROCESS

TECHNICAL FIELD

The present invention relates generally to process controllers which simulate or create virtual sensors and more particularly to process controllers which construct empirical models of a process based on process data measured during previous runs of that process.

BACKGROUND ART

Generally, processes can be classified into continuous, semi-continuous and batch processes. A continuous process is one which operates on raw materials or feed elements at a continuous rate to produce a continuous stream of product at an output. Examples of continuous processes include petroleum refining processes, vitamin C production processes and certain commodity chemical manufacturing processes. The values of process variables, such as temperature, pressure, flow rate, etc., typically remain the same over time at any location within a continuous process.

A batch process is a process which operates on a limited quantity of raw materials or feed elements as a group and which forces those feed elements through a series of process steps over time to produce an output product at the completion of the process steps. Usually, no new feed elements are introduced into a batch process during operation of the process steps. Examples of batch processes include the manufacture of beer, the manufacture of some pharmaceutical drugs and the production of many specialty chemicals. The values of process variables, such as temperature, pressure, flow rate, etc., typically change over time at one or more locations within a batch process.

A semi-continuous process is a continuous process which has batch process components therein. Typically, a semi-continuous process operates on a continuous supply of raw materials to produce a continuous stream of output product but has a set of, for example, mixers which mix a limited quantity of the materials being processed for a limited time somewhere within the process.

There are many situations in which it is beneficial to estimate a future state of a continuous, semi-continuous or batch process based on past or current values of process variables such temperature and pressure. In some situations it is also desirable to estimate the current value of one or more unmeasurable process variables based on the past or current measured values of other process variables. Process state or variable estimation enables the fast correction of continuous and semi-continuous processes because a user can correct control parameters associated with those processes before the quality of the products actually output by those processes begins to deteriorate. Furthermore, process state or variable estimation enables a user to determine if the final output of a particular batch process will be acceptable during the run of a batch process or, on the other hand, if that batch process should be immediately discontinued because the product output by that process will be below acceptable standards.

In the past, multi-layer feed-forward networks, such as neural networks, have been constructed and used as empirical models of continuous, semi-continuous and batch processes to perform process variable estimation and prediction. As illustrated in FIG. 1, a neural network can be represented as a number of interconnected layers of "neurons" having inputs and outputs thereto. In particular, neural networks include an input layer which comprises the inputs to the neural network, an output layer which produces the outputs of the neural network and any number of "hidden" layers.

Inputs to a neural network typically include measured or ascertainable values for process variables (or input variables) while outputs of a neural network typically represent the predicted values of one or more attributes of the product produced by the process being modeled. These predicted attributes or output variables may include, for example, consistency, hardness, pH, smell, etc.

The hidden layers of a neural network connect the input layers to the output layers in a manner which is configured to produce a predicted set of output values at the output layer from the set of input values delivered to the input layer. The mathematical manipulation performed by a neural network is defined by the interconnections between the input, hidden and output layers and weights associated with each of the layers.

More specifically, the input layer of a neural network receives information in the form of input variable values and, typically, consists of one neuron for each provided input variable. Usually the neurons in this layer perform no function other than buffering the input variable values. Each hidden layer of a neural network processes information from the input layer or other hidden layer and sends the results to the next layer which may be another hidden layer or the output layer. Hidden layers are internal to the neural network and have no direct contact with or counterpart in the process being modeled. Hidden neurons usually have sigmoidal transfer functions necessary to capture non-linear information. As noted above, the output layer of a neural network produces calculated output values and, typically, consists of linear neurons.

As illustrated in FIG. 1, neural networks may also include bias neurons which are connected to each neuron except those neurons in the input layer. Bias neurons behave similarly to other neurons in the same layer, except that bias neurons do not receive inputs from other neurons. Instead, bias neurons are constant-source inputs which provide a value of one.

During operation, each neuron of a neural network sums the signals provided at its input, multiplies that summation signal by a set of weights, which are selected or determined during training of the neural network, to produce a set of weighted summation signals and provides one of the weighted summation signals to each neuron of the next layer. These addition and multiplication steps are performed simultaneously for the neurons in each layer, beginning with the input layer and proceeding in a feed-forward manner though the hidden layers to the output layer, to produce the output values of the neural network. For a well trained neural network, the output values comprise predicted values of the output variables of a process based on the provided input variable values.

Although the neural network of FIG. 1 includes one hidden layer having five neurons, neural networks may have any number of hidden layers, each having any desired number of neurons. Typically, neural networks that include a large number of hidden layers and/or a large number of neurons per layer comprise a better model of a process. However, such large neural networks are also more difficult to construct, require more processing time to build and to implement and can actually be less accurate when used to make general predictions about a process than simpler neural networks.

Generally, a neural network is constructed to model a process by performing a number of operations. First, process data pertaining to a number of process input variables and output variables is measured or collected. Next, the collected data is preprocessed to eliminate or account for missing values, noise in the data and other data characteristics which may cause the neural network to be constructed from incomplete or erroneous data. This pre-processing procedure is necessary because measured process data often contains missing values, noise and unexpected upsets caused by different sources within the process.

A set of input variables and a set of output variables are then chosen to be used as inputs and outputs to the neural network. Typically, a time delay associated with each of the input variables is also selected or determined. The choice of a time delay for each input variable allows the set of input variables to include the same or different process variables measured at different times during the process. For example, a user may select to use temperature at five minutes before the output and pressure at six minutes before the output as two of the inputs to a neural network. The step of choosing input variables and time delays associated therewith is critical to the creation of an accurate empirical model for a process. Furthermore, the inclusion of irrelevant process variables as inputs to a neural network can degrade the prediction accuracy of that neural network.

When all of the input variables and time delays have been chosen, a training file including data pertaining to the selected input and output variables at the selected time delays is created from data which has been collected from the process. In particular training variable values for each of the selected input and output variables at the selected time delays are gathered or generated from data associated with a number of different runs of a process or a number of different times within the process. Thereafter, the neural network is trained using the data within the training file as inputs and outputs thereto.

Generally, training a neural network includes the steps of determining the number of hidden neurons and the number of hidden layers for the neural network and then adjusting the weights of the neurons so as to create a neural network which produces the statistically best approximation of the output values within the training file from the input values within the training file. In particular, a neural network training program may adjust the neuron weights in proportion to a calculated error between the calculated outputs and a set of actual or target outputs (provided within the training file) to reduce the difference between the calculated and target output values. Such weight correction is typically accomplished using a back propagation learning algorithm which distributes the output error to each individual weight by, for example, adjusting the output layer weights before adjusting the input layer weights. Such a back propagation learning algorithm may use a gradient descent method, which always moves toward reducing the training error according to an assigned learning rate, or a conjugate gradient method which essentially combines current information about the gradient with that of the gradients from previous iterations to change the weights. The conjugate gradient method improves the learning speed and robustness of the neural network.

The particular steps necessary for training a neural network are well known and are not necessary for an understanding of the present invention. Therefore, neural network training methods will not be further described herein. However, for a more complete discussion of neural network training methods, reference may be made to the following books: Dayhoff, "Neural Network Architecture: An Introduction," (1990) and Simpson, "Artificial Neural Systems: Foundations, Paradigms, Applications and Implementations," (1990).

After a neural network is trained for a particular process, the correct operation or predictive ability of that neural network is verified on a new set of process data to determine how well the neural network actually predicts measured process variable outputs from the selected process variable inputs.

To develop a training file for use in training a neural network, a user typically first creates a set of input and output files, wherein each input file includes measured or ascertained data for one input variable at a number of times and wherein each output file includes measured or ascertained data for one output variable at a number of times. Usually, these input and output files are created for continuous processes by collecting a set of measurements for each of the selected input and output variables over a time period during which the continuous process is running. Input and output files are usually created for batch processes by appending a number of batch files end to end, wherein each batch file includes the measurements of the each of the selected input and output variables over the length of a particular run of the batch process.

Training files are created by pulling out numerous records from the input and output files, wherein each record has a value for each of the selected input and output variables at the selected time delays. However, because input files are created for batch processes by appending batch files together, it is possible to produce one or more training records which have values for input variables and/or output variables that were measured during different batch runs of a batch process. Furthermore, it is possible to create training records for both batch and continuous processes which include values for input and/or output variables which were measured at times before and after a significant event within the process, such as the addition of a catalyst.

It has been recognized by the inventor, however, that training feed-forward predictive networks, such as neural networks, using training records that have process variable values from different runs of a batch process or from times before and after a significant event within a process, degrades the quality of the developed network and, therefore, the quality of the predictions made using that network. In other words, the inventor has recognized that empirical models and, particularly, feed-forward predictive networks like neural networks, which are trained from training records having data from different batch runs of a batch process or from times before and after a significant event within a process are, in effect, trained on situations which never occurred within the process being modelled. As a result, these models are not as predictive of a process as are models trained on records having data from only one batch process run and data that does not cross a significant event within a process.

SUMMARY OF THE INVENTION

The present invention relates to a system and method of creating training records for use in training a feed-forward predictive network, such as a neural network, to create an empirical model of a process. Generally, according to the present invention, training records for use in training feed-forward predictive networks, such as neural networks, are constructed in a manner which prevents the inclusion of data from different batch processes or data measured before and after a significant event within a process, such as the addition of a catalyst or a recalibration of the process control components.

According to one aspect of the present invention, a workstation associated with a process control system develops a training record, capable of being used to create an empirical model of a process, from data pertaining to a plurality of variables associated with the process. Preferably, the workstation runs a program or a routine which creates a file having multiple values for each of the plurality of variables. The routine indicates a position within the file by, for example, placing a flag or a separator between data within the file or by creating and storing a time-stamp which references a position within the file.

The routine then selects a value within the file for each of the plurality of variables to define a record. Next, the routine determines if first and second of the values within the record are associated with positions within the file which are on different sides of the indicated position. If the first and second values are on different sides of the indicated position, the routine prevents the use of the defined record as a training record for training an empirical model of the process. If, however, all of the values within the record are on the same side of the flag or separator, then the record can be used as a training record for training an empirical model of the process.

In one embodiment, the flag or separator may include a set of fictitious data values placed within the file at the indicated position. In such a configuration, the routine checks to determine whether one of the values within the record comprises one of the fictitious data values and, if so, the record is prevented from being used as a training record.

If the process is a batch process, the routine preferably concatenates data values from two batch files associated with different batch runs of the batch process to create the file and then places the flag or separator in the file to mark the place were the data from the two batch files was appended together. The routine may also place the flag or separator within the file to indicate a position associated with a significant event within the process.

According to another aspect of the present invention, a device or method which creates an empirical model of a process from a set of data values for each of a plurality of variables associated with the process develops a file having a multiplicity of values for each of a sub-set of the plurality of variables. Thereafter, a position within the file is indicated by a flag, separator, time-stamp, set of fictitious data values or any other indicator. Next, values within the file associated with one or more of the sub-set of the plurality of variables are selected to define a record. It is then determined if any value within the record is at a position within the file which is on one side of the indicated position while any other value within the record is at a position within the file which is on the other side of the indicated position. If none of the values within the record are separated from any of the other values within the record by the flag or other indicator, the record is classified as a training record and is used to create an empirical model, such as a neural network, for the process.

BRIEF DESCRIPTION OF THE DRAWINGS

FIG. 8a illustrates an example of an input and output file for use in training a neural network;

FIG. 8b illustrates an example of an input and output file for use in training a neural network having separators according to the present invention; and FIG. 9 illustrates a training file developed from the input and output files of FIG. 8a for use in training a neural network.

DETAILED DESCRIPTION

Figure 1:
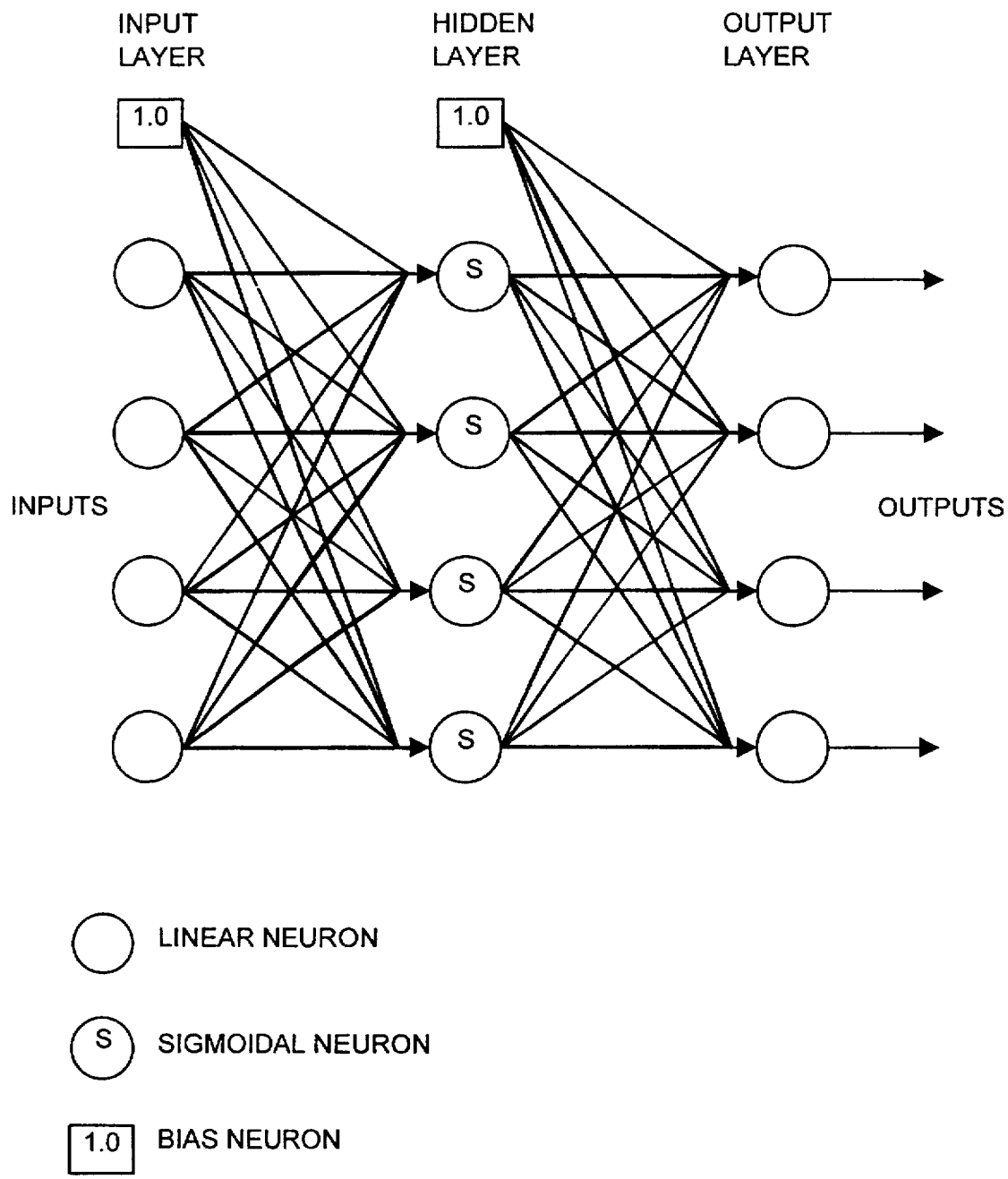
FIG. 1 is schematic diagram of a classic neural network.
Figure 2:
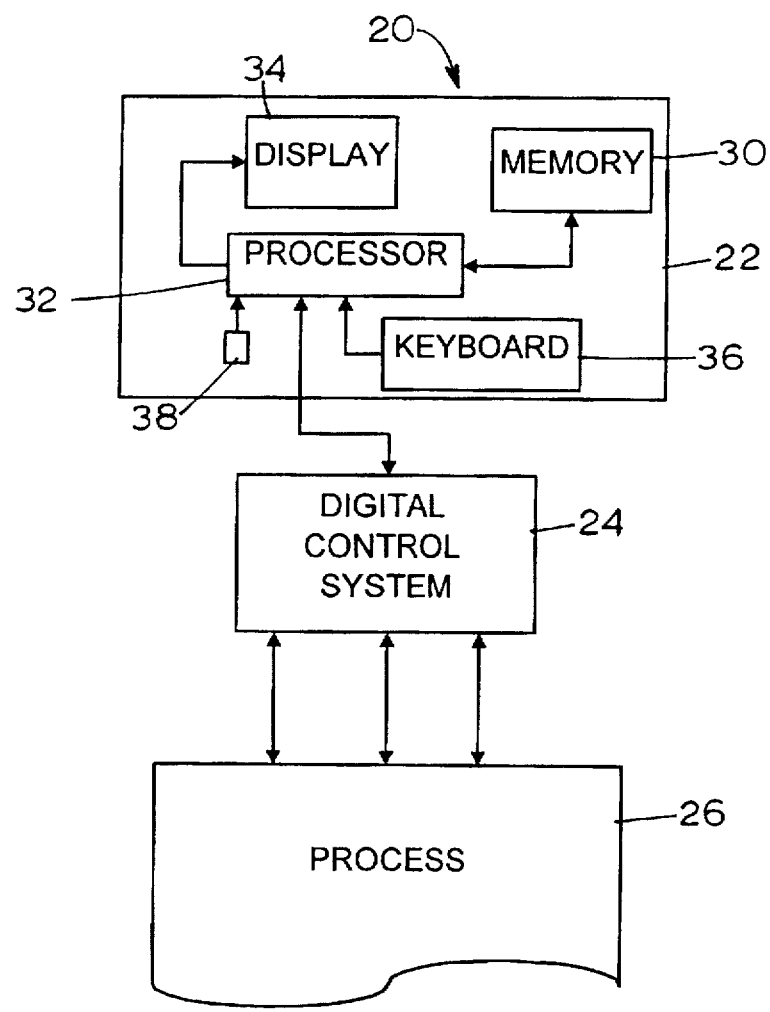
FIG. 2 is a block diagram of a process control system which develops an empirical model of a process according to the present invention.

Referring now to FIG. 2, a process control system 20, capable of creating and using an empirical model of a process, includes a user workstation 22 which is connected to and communicates with a digital control system (DCS) 24. The DCS 24 is connected to and communicates with sensors and other field devices (not shown) within a process 26, which may be any type of continuous, semi-continuous or batch process having process variables, such as temperature, pressure, etc.

The DCS 24 may comprise any desired or known type of controller capable of controlling the process 26 and of obtaining data pertaining to the values of process variables associated with the process 26. The DCS 24 may provide such process variable values to a memory 30 within the workstation 22 or may provide such values to any other memory or database accessible by the workstation 22.

Preferably, the workstation 22 is a P.C. based workstation that includes a microprocessor 32 connected to the memory 30 and to user input and output devices including a display screen 34, a keyboard 36 and a mouse 38. The workstation 22 may also include any other desired peripherals such as printers, modems, etc. As noted above, the memory 30 may be a part of the workstation 22 and connected to the DCS 24 through the microprocessor 32 or may be located outside of the workstation 22 and connected directly to the DCS 24 and the microprocessor 32.

During or after operation of the process 26, a user instructs the microprocessor 32 to run a program or a routine that creates an empirical model of the process 26. The routine, which may be stored in the memory 30, may construct any desired type of empirical model but, preferably, constructs, trains and tests a feed-forward predictive network, such a neural network, to model the process 26.

After the empirical model of the process 26 is constructed, this model may be used in any known manner to, for example, predict future values of process variables or process outputs of the process 26, to estimate current values of unmeasurable process variables of the process 26, to determine if the control of the process 26 needs to be altered to correct the operation of that process, or to perform any other desired function with respect to the process 26.

Generally, this program or routine constructs an empirical model for the process 26 from process variable data which has been collected by the DCS 24 and stored in the memory 30 or stored in any other memory coupled to the microprocessor 32. Instead or in addition thereto, however, the program may use process variable data collected by a user and downloaded to the workstation 22 electronically or manually or any other desired data pertaining to the process 26 to create the empirical model. The program may also calculate process data associated with process variables which are statistical in nature, such as means, medians and standard deviations, from the data collected by a user or the DCS 24 and use this statistical data to create an empirical model. The statistical process variable data may be associated with any length of time and/or cover any desired time period associated with the operation of the process 26.

Figure 3:
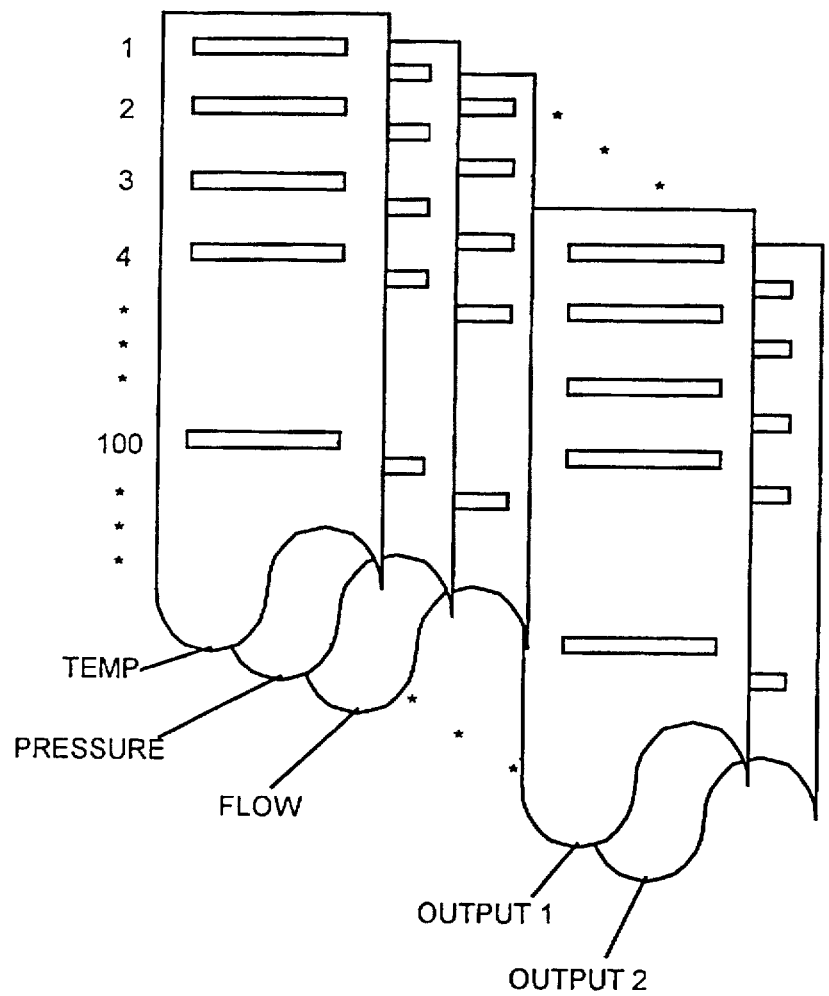
FIG. 3 is a diagram illustrating a continuous file used by the system of FIG. 2.

FIG. 3 illustrates a data file for a continuous process, referred to hereinafter as a continuous file, which may be developed by the DCS 24 and/or the workstation 22 and stored in the memory 30. As illustrated in FIG. 3, a continuous file may include a measurement or data value (indicated in FIG. 3 by a rectangular box) for each of a set of measurable or statistical process variables associated with a process, such as temperature, pressure, flow, etc., at a number of times. A continuous file may also include a measurement or data value for each of a set of output variables associated with a continuous process at the same or a different number of times.

The continuous file illustrated in FIG. 3 includes sub-files having data for the temperature, pressure and flow process variables measured or determined at, for example, one hundred times during the continuous process and subfiles having data for two output variables (indicated as output 1 and output 2) measured or determined at, for example, one hundred times during the process. However, any other process variables and/or any other number of process variables and output variables may be measured and included within the continuous file of FIG. 3. Furthermore, the measurements or determinations for each of the sub-files of FIG. 3 may be made at the same or at different times and each sub-file may include the same or a different number of values as any of the other sub-files of FIG. 3.

The sub-files of FIG. 3 are illustrated as including one hundred values which may, for example, correspond to one measurement every minute for the first one hundred minutes of a continuous process. However, because, a continuous process is ongoing, further data can be added to the bottom of each of the sub-files of the continuous file of FIG. 3 as that data is measured or obtained by, for example, the DCS 24.

Figure 4:
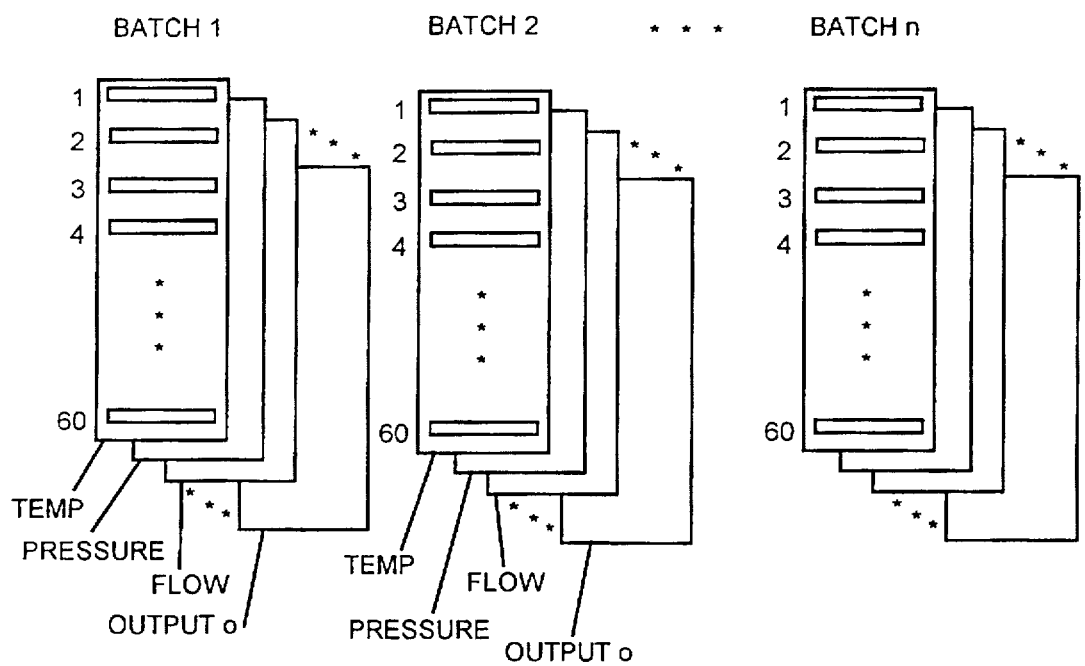
FIG. 4 is a diagram illustrating a set of batch files used by the system of FIG. 2.

FIG. 4 illustrates a set of data files developed by, for example, the DCS 24 for n (where n can be any number greater than zero) runs of a batch process. Each of these data files is referred to hereinafter as a batch file. As illustrated in FIG. 4, each batch file may include a set of measurements or data values for each of a set of measured or statistical process variables associated with a batch process. The batch files of FIG. 4 may also include a set of output measurements or data values for one or more output variables associated with a batch process. The batch files illustrated in FIG. 4 include data associated with any number of process variables and any number (o) of output variables.

Unlike continuous files, which may have a different output value associated with an output variable at each time of the process, each of the batch files of FIG. 4 typically has only one output value associated with each output variable because there is only one output of each batch process (instead of a continuous output). Furthermore, because batch processes have a definite beginning and ending point, the batch files of FIG. 4 cannot have any further data added thereto. Instead, a new batch file is created for each run of the batch process.

Although each of the n batch files of FIG. 4 are indicated as having sixty measurements therein, which may correspond to one measurement per minute in an hour long batch process, the separate sub-files (marked as temperature, pressure, etc.) of each of the batch files and of the different batch files of FIG. 4 can have different numbers of measurements or values associated therewith. Thus, for example, the pressure sub-file of the first batch file of FIG. 4 may include the same or a different number of measurements or values as the temperature sub-files and/or the flow sub-files associated with the first batch file and may include the same or a different number of measurements or values as any of the sub-files of any of the second, third, . . . nth batch files of FIG. 4. Also, the measurements of any two sub-files of the same or any two different batch files may be made at the same time or at different times with respect to the beginning or the end of a batch process.

The program or routine implemented by the processor 32 uses the data within the continuous file of FIG. 3, if the process 26 is a continuous process, or uses the data within the batch files of FIG. 4, if the process 26 is a batch process to create a model, which may be an empirical or a semi-empirical model, for the process 26. This routine will now be described in more detail with respect to FIG. 5.

Figure 5:
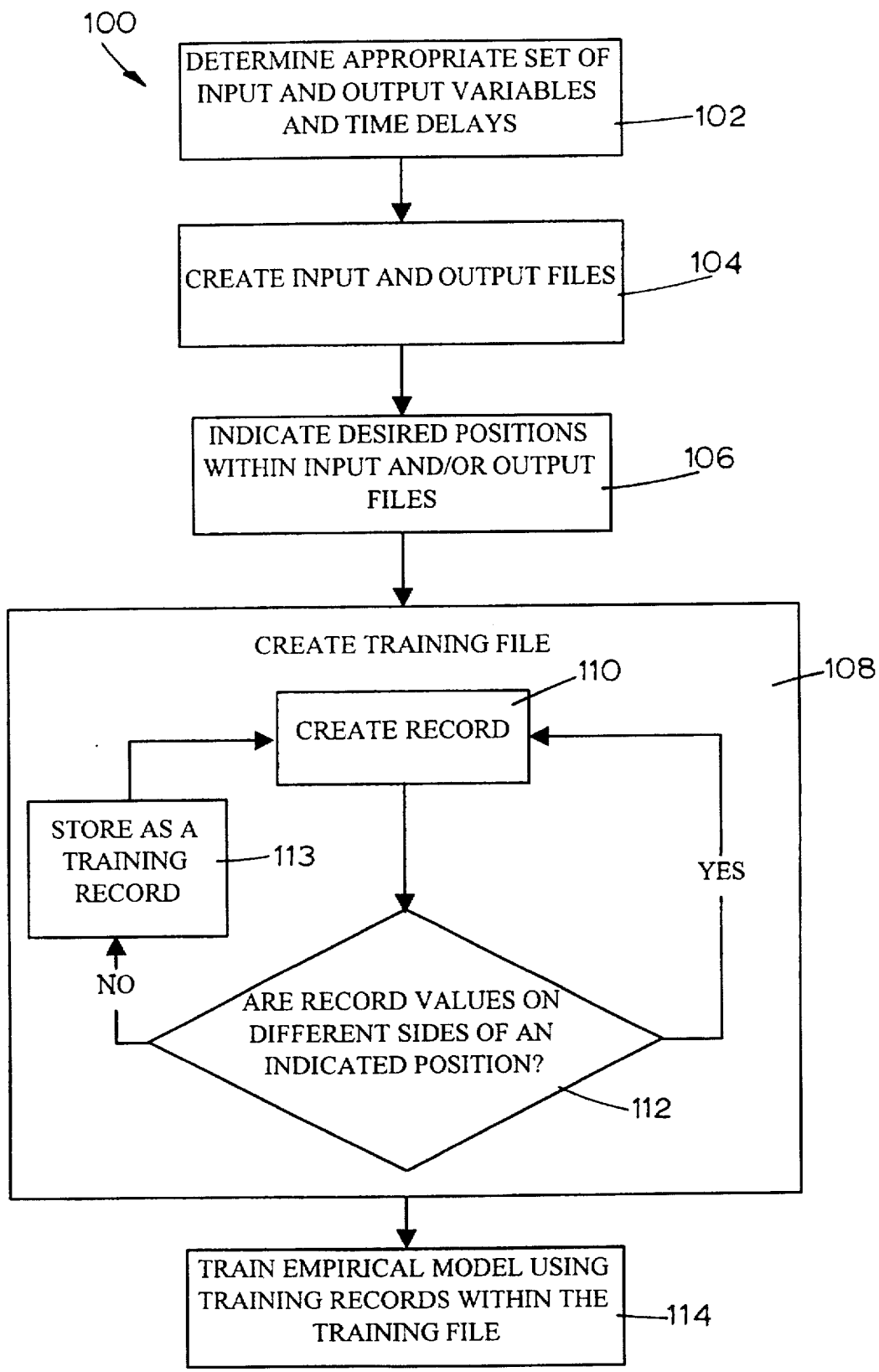
FIG. 5 is a flowchart illustrating a routine for developing training files for use in creating an empirical model for a process according to the present invention.

Referring to FIG. 5, the routine, indicated generally by the reference numeral 100, includes a block 102 which determines an appropriate set of input variables and output variables and the time delays associated therewith for use as input variables and output variables for the empirical model. The block 102 may determine these variables in any desired manner such as allowing a user to select such input and output variables and the time delays associated therewith or aiding the user in the selection of such variables and time delays using any desired technique.

A block 104 then creates input and output files including data pertaining to the selected set of input variables and output variables determined by the block 102. If the process being modeled is a continuous process, the block 104 simply copies data for each of the input and output variables from the continuous file for that process. If the process being modeled is a batch process, however, the block 104 develops the input and output files by concatenating the sets of data values for each of the input and output variables from the batch files associated with multiple runs of one or more batch processes.

A block 106 then indicates one or more positions within the input and/or output files created by the block 104 to indicate, for example, the location within the data stream of those files at which data from different batch files was concatenated or attached together or the location within the data stream of those files where a significant event occurred within the process. Significant events may comprise any event which radically alters the process, such as the addition of a catalyst, the recalibration of process control elements, etc., and which may cause training records having data on both sides of the significant event to be less indicative of normal operation of the process.

The block 106 may place flags within the data stream of the input and output files to indicate the desired positions or may indicate one or more desired positions within the input and/or output files by storing a set of addresses associated with those positions. If the data within the input and output files have time-stamps associated therewith, the block 106 may create and store a time-stamp for each indicated position. These time-stamps may be stored within the input or output files or stored in a separate file. Alternatively, the block 106 may place a set of fictitious data values within the input and/or output files at the indicated positions or may mark those positions using any other desired technique.

Next a block 108 creates a training file from the input file and the output file. This training file includes a predetermined number of training records, each of which includes one value for each of the chosen input and output variables at the selected time delays.

To create a training record, a block 110 develops a record having one value for each of the chosen input variables and output variables at the selected time delays from the input and output files. A block 112 then determines if each of the values within the record are located in the input or output file at a position which is on the same side of each of the indicated positions as each of the other values of that record. In other words, the block 112 determines if the values within the record are separated from each other in the input and output files by an indicated position. To perform this function, the block 112 may determine if a flag or separator has been placed within the input/output files at a position between any two values of the record. Alternatively, the block 112 may compare the time-stamps of the indicated positions with the time-stamps of each of the values of the record to determine if the time-stamps associated with any two values of the record cross over the time-stamp of any indicated position. Likewise, the block 112 may determine if any of the values of the record comprise the fictitious data values inserted into the input or output files, indicating that the record has values which cross an indicated position.

If the block 112 determines that any of the values within the record cross an indicated position, the block 112 discards that record to prevent it from being used to train an empirical model for the process and returns control to the block 110. However, if the block 112 determines that none of the values within the record is separated from any of the other values of that record by an indicated position, then that record is classified as a training record by a block 113 so that the record may be used to train an empirical model for a process.

The block 113 returns control to the block 110 which then develops a new record from the input/output files. Operation of the blocks 110, 112 and 113 continues until the block 108 determines that a desired number of training records has developed, at which time control is transferred to a block 114.

The block 114 trains an empirical model, and, preferably, a feed-forward predictive network such as a neural network using the training records within the training file according to any desired or known technique to create an empirical model of the process 26. If desired, the block 114 can test or verify the computed empirical model according to any desired method.

Figure 6:
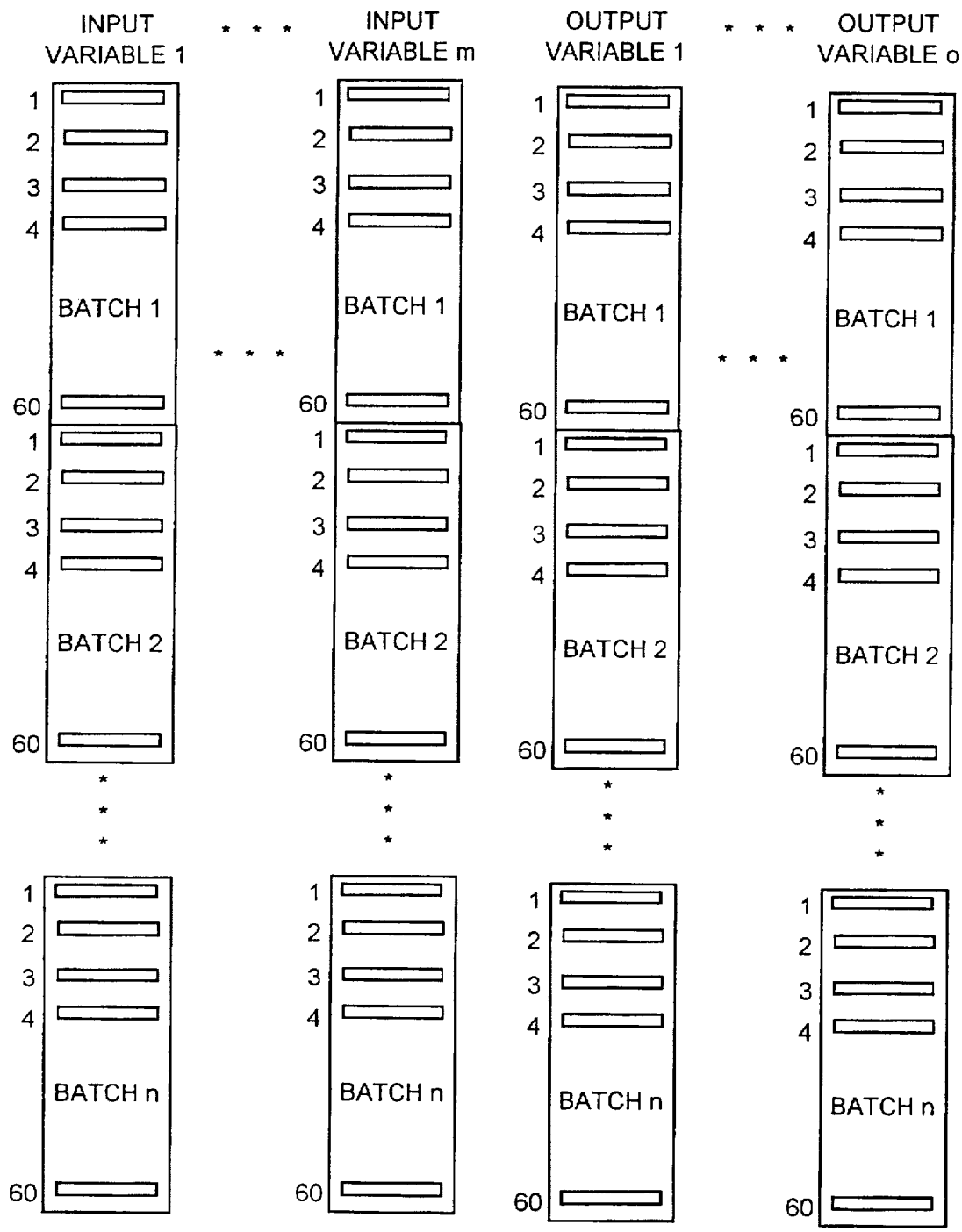
FIG. 6 is a diagram illustrating a set of input files and output files developed from the batch files of FIG. 4.
Figure 7:
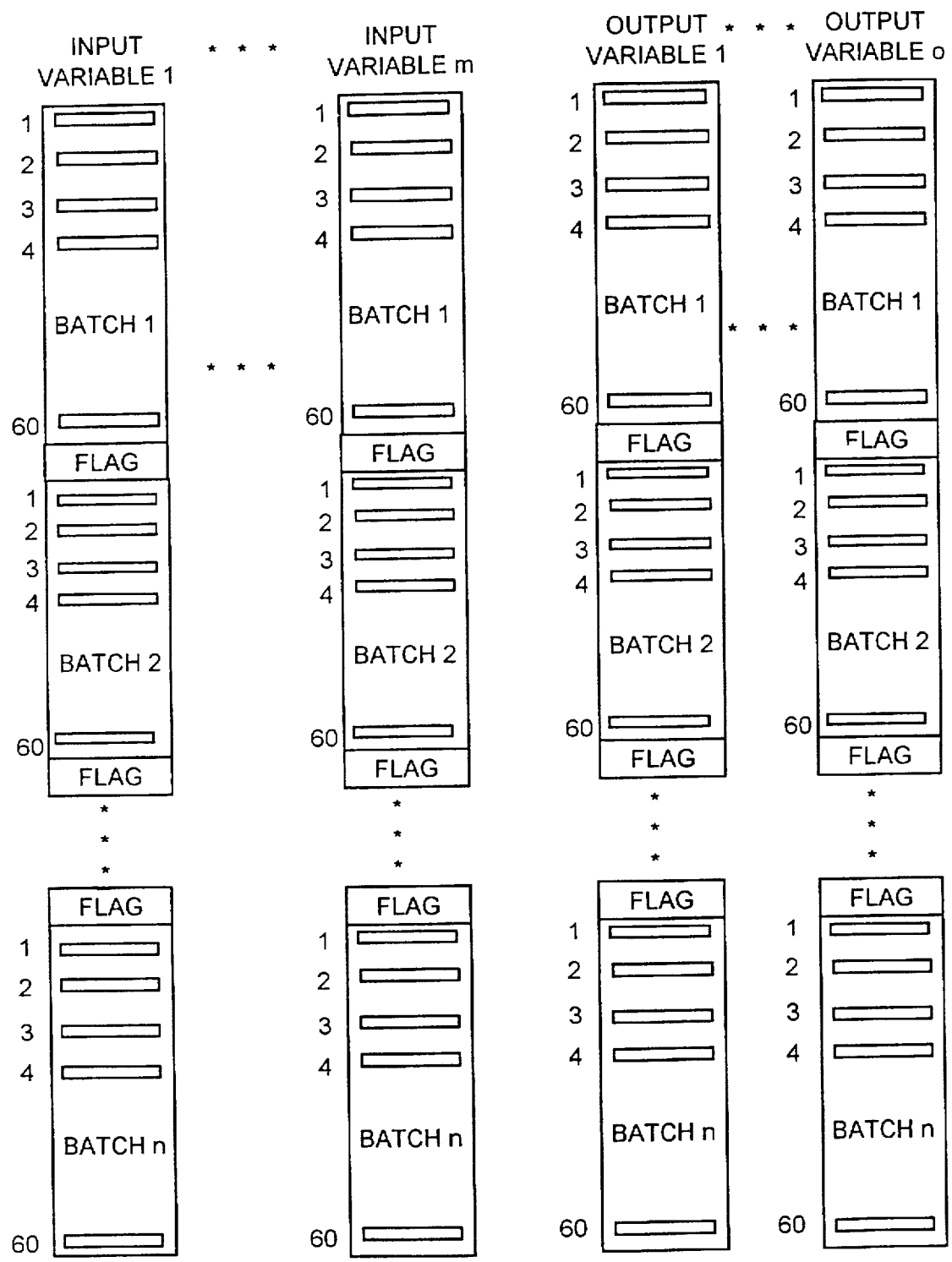
FIG. 7 is a diagram illustrating a set of input files and output files developed from the batch files of FIG. 4 according to the present invention.

FIGS. 6–9 will be used to describe an example of creating a set of training records both with and without the use of separators. FIG. 6 illustrates a set of input and output files associated with a selected set of input and output variables which were developed from the batch files of FIG. 4 and which do not include separators. FIG. 7 illustrates the same input and output files except that the files of FIG. 7 include separators or flags therein.

In particular, the input files of FIGS. 6 and 7 comprise concatenated lists of the values measured for each of the selected input variables for each of a number (n) runs of a batch process. The input variable 1 illustrated in FIGS. 6 and 7 may, for example, be associated with the temperature sub-files illustrated in FIG. 4. Likewise, the output files of FIGS. 6 and 7 comprise concatenated lists of the values of each of the selected output variables for each of the n runs of the batch process. Flags or separators have been inserted into the files of FIG. 7 at the places where data from different batch runs was concatenated together.

If the process 26 is a continuous process, the input files and output files of FIGS. 6 and 7 would merely comprise a list of the values measured for the selected input variables and output variables at each time of the continuous process. In such a situation, the flags or separators of FIG. 7 would be inserted into the input and output files wherever a significant event occurred within the process.

To develop a training file from the input and output files of FIGS. 6 and 7, the empirical modelling routine 100 combs through these files to create training records having one data value for each of the selected variables at the selected time delays. If desired, the empirical modelling routine 100 may process the training records by eliminating records having gross outliers or data which is above or below predetermined limits and records which have data missing therefrom, i.e., which have no value for one or more of the selected variables at the selected time delays. Furthermore, the routine 100 may clean up data by interpolating between values to create values at times which no value was actually measured. As noted above, however, the empirical modelling routine 100 automatically eliminates or discards records which have data from more than one batch run of a batch process or which have data gathered before and after a significant event within a process as determined by the separators within the input and output files of FIG. 7.

An example of how an empirical modelling routine uses the separators or the flags illustrated in FIG. 7 will be described with respect to FIGS. 8a, 8b and 9. FIG. 8a illustrates an input file having a set of normalized values for temperature, pressure and flow for two concatenated batch files and an output file having normalized values for a single output variable for the two concatenated batch files. Each of the concatenated batch files has five measurements associated therewith.

FIG. 8b illustrates input and output files for the same two concatenated batch files except that these files have separators therein at positions between the data of the concatenated batch files. FIG. 9 illustrates a set of training records made from the input and output files of FIG. 8a.

For the purpose of this example, it is assumed that the routine has determined, either automatically or via input from a user, that the neural network for a process should be trained using the temperature, pressure and flow input variables to predict the output variable. It will also be assumed that the routine has established that the temperature variable should have no time delay associated therewith, that is, that the temperature measurement should be made at the same time as the output variable measurement, that the pressure measurement should have a time delay of one unit associated therewith, that is, that the pressure measurement should be made at one time unit before the output variable measurement, and that the flow variable should have a time delay of two units associated therewith, that is, that the flow measurement should be made at two units before the output variable measurement.

Using these assumptions, the first training record of FIG. 9 is developed from the input and output files of FIG. 8a by choosing the output variable value associated with the last time period of the output file of FIG. 8a (i.e., 0.321095), the temperature measurement made at that same time period (i.e., 0.895638), the pressure measurement made at the time period immediately prior to the last time period (i.e., 0.347294) and the flow measurement made at two time periods before the last time period (i.e., 0.874449). Likewise, the second training record of FIG. 9 is made by selecting the output variable value at the second to last time period, choosing the temperature measurement made in that same time period, the pressure measurement made at the immediately previous time period and the flow measurement made two time periods prior to the second to last time period. As is evident, the other four training records of FIG. 9 are developed in the same manner.

However, creating training records from the input files of FIG. 8a leads to the creation of training records, such as those numbered four and five in FIG. 9, which include data from different batches of the process being modeled. In particular, training record number four of FIG. 9 has a flow measurement found in the first batch of the input files of FIG. 8a but includes pressure, temperature and output measurements found in the second batch of the input files of Fig. 8a. Likewise, training record number five of FIG. 9 has flow and pressure measurements found in the first batch of the input files of FIG. 8a but includes temperature and output measurements found in the second batch of the input files of FIG. 8a.

Thus, training records four and five of FIG. 9 do not represent data from any batch run which actually occurred. Training a neural network using these training records is not desirable because the neural network will be trained on records which do not represent an actual condition within any run of the batch process.

The problem of creating erroneous training records is avoided by using the input and output files of FIG. 8b, as might have been developed by the routine 100, to recognize when any one training record contains data separated by a flag and, thereby, to recognize that the data within the training record is associated with different batch runs of a batch process or is separated by a significant event in a continuous or batch process.

While the separators or flags according to the present invention have been illustrated as being placed in each of the input and output files of FIGS. 7 and 8b, one separator could, instead be placed in one of the input or output files to indicate where batches begin and end or where a significant event occurred. Also, while the separator or position indication concept has been described as being used with a neural network empirical model, this concept can be used with any other empirical model for a process and, for that matter, with any procedure which creates records from continuous process data files or from concatenated sets of batch process data files.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

I claim:

1. A device for developing a training record, capable of being used to create a model of a process, from data pertaining to a plurality of variables associated with the process, comprising:

means for creating a file having multiple values for each of the plurality of variables from the data pertaining to the plurality of variables;

means for indicating a position within the file;

means for selecting first and second of the values within the file to define a record;

means for determining if the first value is associated with a position within the file which is on one side of the indicated position and if the second value is associated with a position within the file which is on another side of the indicated position to thereby determine if the first and second selected values are on different sides of the indicated position; and means responsive to the determining means for preventing the use of the defined record as a training record when the first and second values are on different sides of the indicated position.

2. The device of claim 1, wherein the selecting means selects a value associated with each of the plurality of variables to define the record, the determining means determines if any of the selected values are associated with a position within the file which is on a different side of the indicated position as the position of any other of the selected values and further including means for classifying the defined record as a training record if all of the selected values within the defined record are associated with positions within the file which are on the same side of the indicated position.

3. The device of claim 1, wherein the indicating means includes means for placing a flag within the file at the indicated position.

4. The device of claim 1, wherein the first and second values each have a time-stamp associated therewith, the indicating means includes means for storing a time-stamp associated with the indicated position and the determining means includes means for comparing the time-stamp of the indicated position with the time-stamps associated with the first and the second values.

5. The device of claim 1, wherein the indicating means includes means for placing a set of fictitious data values within the file at the indicated position and the determining means includes means for checking whether one of the first and the second values comprises one of the fictitious data values.

6. The device of claim 1, wherein the process is a batch-type process, the creating means includes means for concatenating data values from two batch files associated with different batch runs of the batch process and the indicating means indicates the position between the data from the two batch files.

7. The device of claim 1, wherein the indicating means indicates a position within the file associated with a significant event within the process.

8. A device for creating a model of a process from a set of data values for each of a plurality of variables associated with the process, comprising:

means for creating a file having a multiplicity of values for each of a sub-set of the plurality of variables from the set of data values for each of the plurality of variables;

means for indicating a position within the file;

means for selecting a first value within the file and a second value within the file;

means for determining if the first value is at a position within the file which is on one side of the indicated position and if the second value is at a position within the file which is on the other side of the indicated position;

means for developing a training record from the first and second values if the position of the first value is on the same side of the indicated position as the position of the second value;

means for training a model of the process using the training record.

9. The device of claim 8, wherein the indicating means includes means for placing a flag within the file at the indicated position.

10. The device of claim 8, wherein the indicating means includes means for storing a time-stamp associated with the indicated position, wherein the first and second values each have a time-stamp associated therewith and wherein the determining means includes means for comparing the time-stamp associated with the indicated position with the time-stamps associated with the first and second values.

11. The device of claim 8, wherein the indicating means includes means for placing a set of fictitious data values within the file at the indicated position and the determining means includes means for ascertaining whether one of the first and second values comprises one of the fictitious data values.

12. The device of claim 8, wherein the process is a batch process, the set of data values for each of a plurality of variables associated with the process comprises a multiplicity of batch files associated with different runs of the batch process, the creating means includes means for concatenating data values from the multiplicity of batch files and the indicating means indicates the position within the file between the values of two of the multiplicity of concatenated batch files.

13. The device of claim 8, wherein the indicating means indicates a position within the file associated with the location of a significant event within the process.

14. A method of developing a training record for use in creating a model for a process which has a plurality of variables associated therewith, including the steps of:

creating a file having multiple values for each of the plurality of variables;

indicating a position within the file;

selecting multiplicity of values from the file to define a record;

determining if a first one of the selected values within the record is associated with a position within the file which is one side of the indicated position and if a second one of the selected values within the record is associated with a position within the file which is on another side the indicated position to determine if the first and second selected values are on the same side of the indicated position; and preventing the use of the defined record as a training record if the first and second selected values are not on the same side of the indicated position.

15. The method of claim 14, further including the step of classifying the record as a training record if all of the selected values within the record are associated with positions within the file which are on one side of the indicated position.

16. The method of claim 14, wherein the step of indicating includes the step of placing a flag within the file at the indicated position.

17. The method of claim 14, wherein each of the selected values includes a time-stamp associated therewith, the step of indicating includes the step of creating a time-stamp for the indicated position and the step of determining includes the step of comparing the time-stamp of the indicated position with the timestamps associated with the first and second selected values.

18. The method of claim 14, wherein the step of indicating includes the step of placing a set of fictitious data values within the file at the indicated position and the step of determining includes the step of ascertaining whether any one of the selected values comprises one of the fictitious data values.

19. The method of claim 14, wherein the process is a batch process, the step of creating a file includes the step of concatenating data values associated with two batch runs of the batch process and the step of indicating a position within the file includes the step of indicating the position between the data values associated with the two batch runs of the batch process.

20. The method of claim 14, wherein the step of indicating a position within the file includes the step of indicating the location of a significant event within the process.

21. A method of creating a model of a process having a plurality of variables associated therewith, including the steps of:

developing a set of data values for each of the variables;

creating a file having a multiplicity of values for each of the variables from the set of data values;

indicating a position within the file;

selecting a first value within the file and a second value within the file;

determining if the first value is at a position within the file which is on one side of the indicated position and if the second value is at a position within the file which is on the other side of the indicated position;

using the first and second values to develop a training record if the position of the first value is on the same side of the indicated position as the position of the second value;

creating a model of the process using the training record.

22. The method of claim 21, wherein the step of indicating includes the step of placing a flag within the file at the indicated position.

23. The method of claim 21, wherein the step of indicating includes the step of creating a time-stamp for the identified position, wherein the first and second values have time-stamps associated therewith and wherein the step of determining includes the step of comparing the time-stamp of the identified position with the time-stamps associated with the first and second values.

24. The method of claim 21, wherein the step of indicating includes the step of placing a set of fictitious data values within the file at the indicated position and the step of determining includes the step of ascertaining whether one of the first and second values comprises one of the fictitious data values.

25. The method of claim 21, wherein the process is a batch process, the creating means includes means for concatenating data values from a multiplicity of batch files each of which is associated with a run of the batch process and the indicating means indicates the position within the file between the data values of two of the multiplicity of concatenated batch files.

26. The method of claim 21, wherein the step of indicating a position within the file includes the step of indicating a location of a significant event within the process.

* * * * *